Figure 1:
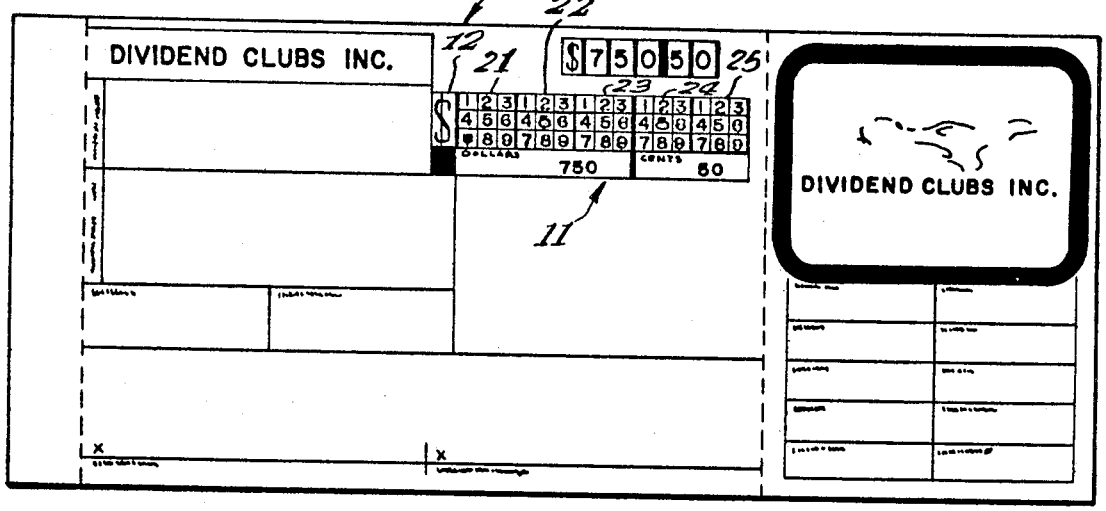

United States Patent [19]
Hochstadt

[11] 3,869,600
[45] Mar. 4, 1975

[54] MANUAL CHARACTER MARKING RECOGNITION SYSTEM

[76] Inventor: Albert M. Hochstadt, 8861 S.W. 85th Ter., South Miami, Fla. 33143

[22] Filed: Sept. 10, 1969

[21] Appl. No.: 856,678

[52] U.S. Cl. ............................. 235/61.12 N
[51] Int. Cl. ................................ G06k 19/00
[58] Field of Search ............... 235/61.12 R, 61.12 N

[56] References Cited
UNITED STATES PATENTS

| | | | |
|---|---|---|---|
| 2,775,405 | 12/1956 | Paston | 235/61.12 R |
| 3,221,148 | 11/1965 | Kreis | 235/61.12 R |
| 3,527,927 | 9/1970 | Bijleveld et al. | 235/61.12 N |

*Primary Examiner*—Daryl W. Cook

[57] ABSTRACT

Two forms of manual character marking recognition systems utilize only three rows of spaces to indicate numerals in a transaction amount. One form is a three by three matrix of marking spaces for each numeral. The other form is a three space column utilizing three simple symbols to indicate each numeral in a transaction amount.

9 Claims, 9 Drawing Figures

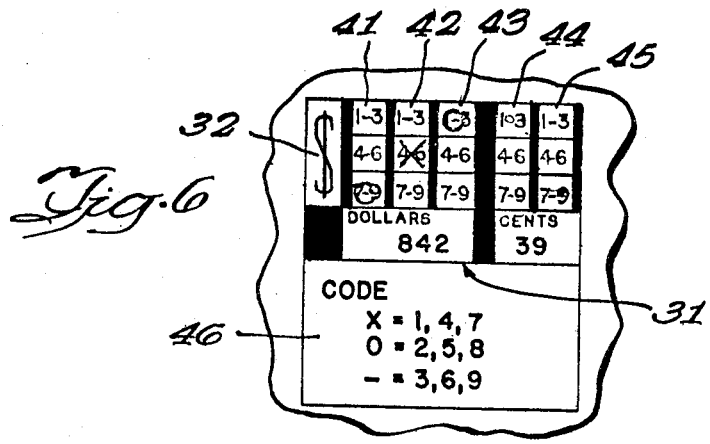
Fig.6
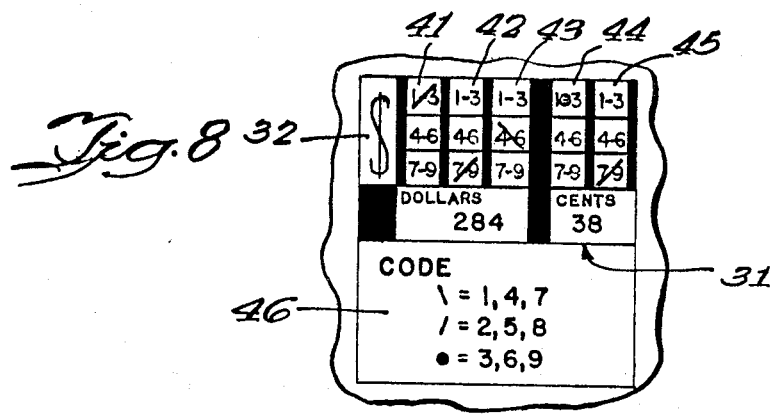
Fig.8
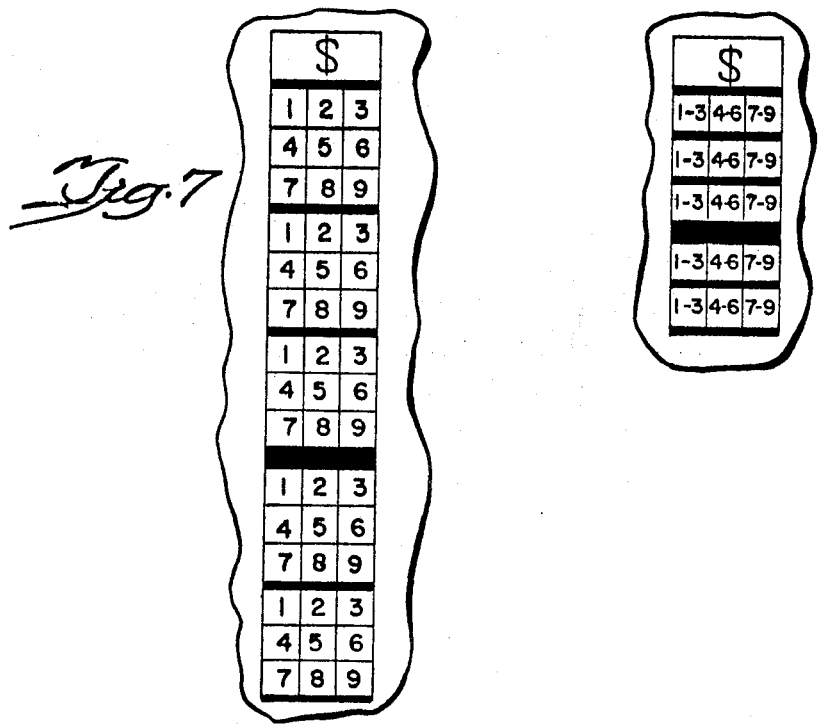
Fig.7
Fig.9

MANUAL CHARACTER MARKING RECOGNITION SYSTEM

The invention relates to character recognition systems and more particularly to a manual character marking system.

Optical character recognition machines and to some extent other types of character recognition machines have come into widespread usage in business and commerce. Optical character recognition machines work particularly well when a predetermined font is utilized. Thus, many business forms such as billing, record keeping, or charge forms have as much of the vital information printed in a predetermined font as possible. For example, a merchant's name and/or identification number is often imprinted on the form by the use of a metal plate and/or a plastic card which contains the merchant's name and/or identification number through the use of one of many imprinting devices presently on the market. The customer having a credit card will have his number imprinted on the form by the merchant making a sale transaction with the customer by taking the customer's credit card which has the customer's identification number in a predetermined font and imprinting it on the form by the use of an imprinter. Some imprinters place both the merchant's name and/or number and the customer's number on the billing, record keeping, or charge form simultaneously. The merchant's and the customer's identification on the form can then be read at any later date automatically by the use of an optical character recognition machine of which a number are available from different manufacturers. One such machine is illustrated and described in U.S. Pat. No. 3,271,740, issued Sept. 6, 1966. While it is desirable to then record the amount of a sales transaction between a customer and a merchant, this is more difficult to accomplish since the amount varies with each sales transaction. In the past, fields of marks have been devised to indicate the numerals which make up the numerical amount of a sales transaction. A common system in use today is to have ten positions or areas on a form for each decimal numeral making up the amount of the transaction. A mark at any one of the ten positions would indicate a numeral from zero to nine respectively. Other coding systems have been devised which, instead of having ten marking areas for each numeral in the amount of a transaction in a line, have as little as four positions. These may be placed in a line to indicate each numeral by using multiple dots. Such coding systems are illustrated in U.S. Pat. Nos. 2,105,291, issued Jan. 11, 1938 and 2,183,559, issued Dec. 19, 1939. However, such coding systems do not lend themselves to being easily understood by customers and merchants since it is not possible to easily mark a separate space for each numeral or to explain what combination of multiple markings properly make up a given numeral. Therefore, such coding systems have not come into use on business forms where manual marking is utilized.

Machines have been devised which will imprint the amount of a sales transaction on a billing record, or charge form in a predetermined font by adjusting certain levers or control to indicate the amount to be imprinted. Such machines are obviously substantially more expensive, both in their initial investment and in maintenance, than a manual marking system having ten numeral marking spaces in the line. Thus, a gap has existed betwen the use of variable amount imprinting machines and the ten spaces in a row per numeral in the amount of the transaction system. Thus, there has existed a need for a manual system which can be easily marked by the maker of a billing record or charging form, which is compact in its positioning on a form and which can be easily read by any of the more simple type optical character recognition equipment presently on the market from a number of manufacturers. The present invention provides a manual system to fulfill this gap in present available character recognition systems.

The type of marking for each numeral may be any conventional easily made mark, such as: "-, o, x, /, or · ". It need only be placed in the area indicating a given numeral in order to be correctly read by any one of a number of optical character recognition machines presently on the market. Nine spaces are provided to indicate each numeral, but they are arranged in a three by three matrix, which has been found to not only save space on the form, but also to be much easier for the marker to quickly and accurately indicate the amount of a sales transaction. It is also faster for a reader to read. It has been found that far fewer mistakes are made by the person marking the amount utilizing this system than utilizing the system of having ten marking areas strung out in a row.

Another form of the present invention utilizes three spaces and three different marks to indicate each numeral.

It is, therefore, an object of the present invention to provide a new and improved character recognition system.

A further object is to provide a manual marking character recognition system, which utilizes a three by three matrix to indicate each numeral in the amount of a transaction.

Another object is to provide a more compact and simple manual marking character recognition system than has previously been available.

Further objects and advantages will become apparent from the following detailed description taken in connection with the accompanying drawings, in which:

FIG. 1 is a front view of a business charge form in accordance with the present invention, FIGS. 2, 3, 4, and 5 are enlarged views of the business charge form shown in FIG. 1 with different marks and different amounts marked on each enlarged view, FIG. 6 is a front view of a modified version of the business charge form illustrated in FIGS. 1 through 5, FIG. 7 is a front view of another modified version of the business charge form illustrated in FIGS. 1 through 5, FIG. 8 is a front view of the business charge form illustrated in FIG. 6 with different markings applied, and FIG. 9 is a front view of a modified version of the business charge form illustrated in FIG. 6.

While this invention is acceptable of embodiment in many different forms, there is shown in the drawings and will herein be described in detail, embodiments of the invention with the understanding that the present disclosure is to be considered as an exemplification of the principle of the invention and is not intended to limit the invention to the embodiments illustrated. The scope of the invention will be pointed out in the appended claims.

Figure 2:
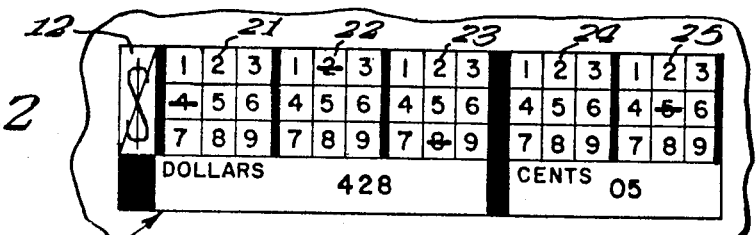

Referring now to FIG. 1, a business form generally indicated as 10, is illustrated which has a manual character recognition field generally indicated at 11, consisting of a dollar sign (space) 12, a hundreds dollar matrix 21, a tens dollar matrix 22, a units dollar matrix 23, a tens cent matrix 24 and a units cent matrix 25. Each of the matrixes 21 through 25 consists of a three by three matrix of small square spaces which contain the numerals 1 through 9. A mark in the given square of a matrix indicates the desired numeral. A zero is indicated by placing no mark whatsoever in the matrix corresponding to the numeral in the transaction amount. For example, FIG. 1 is marked for the transaction amount of $750.00. The dollar sign box when left unmarked is used to indicate a debit to a customer's account, while a mark in the space 12, as illustrated in FIG. 2, indicates a credit to a customer's account. Therefore, one form may be utilized for both debits and credits instead of having a separate form for each.

Figure 3:
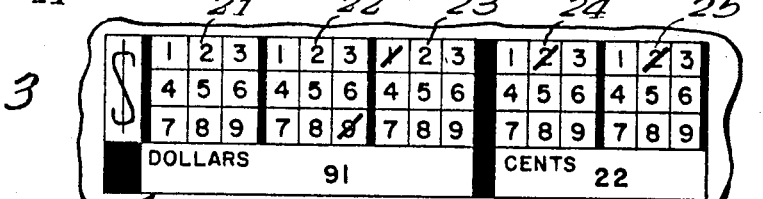
Figure 4:
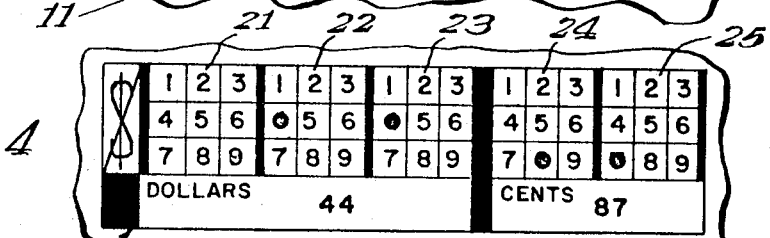
Figure 5:
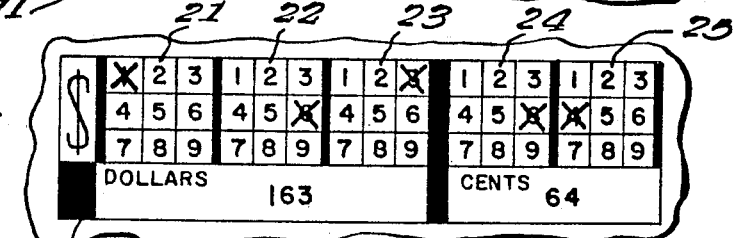

Any form of simple symbol may be utilized to make the marks in the character recognition field 11. In FIG. 2, dashes are utilized to indicate the amount of $428.05. In FIG. 3, slant lines are utilized to indicate the amount of $91.22. In FIG. 4, circles are used to indicate the amount of $44.87. In FIG. 5, x's are utilized to indicate a debit amount of $163.64. Holes may also be punches in the forms to indicate the amounts.

Referring now to FIG. 6, another form of my invention is illustrated which utilizes three spaces in a row to indicate each new numeral in a transaction amount and utilizes three simple symbols such as the dash, o and x. A character recognition field 31 consists of a debit or credit space 32, a hundred dollar column 41, a tens dollar column 42, a units dollar column 43, a tens cent column 44 and a units cent column 45. A code block explaining the symbols 46 is provided on the form for the convenience of the user. Each column consists of three small squares which represent the numerals 1 through 3, 4 through 6, and 7 through 9, respectively. As indicated in the code box or code description 46, an x in the upper box of a numeral column indicates a 1; a 0 indicates a 2; and a dash indicates a 3. In the second box of each numeral, an x indicates a 4; a 0 indicates a 5 and a dash indicates a 6. In the bottom square of each numeral, an x indicates a 7, a zero indicates an 8 and a dash indicates a 9. No mark in any of the boxes indicates a 0 as that numeral. Thus, the numeral in FIG. 6 if $842.39.

The code system of putting a marking in the credit or debit space may be reversed from that illustrated. Further the three by three matrixes used in FIGS. 1–5 may run downward in columns as indicated in FIG. 7 rather than across sequentially in rows. Further, other symbols than the x, zero or dash can be equally well utilized in the modification of my invention shown in FIG. 6 as is illustrated in FIG. 8 wherein slant marks in different directions and dots are utilized. The amount illustrated in FIG. 8 is $284.38.

Further, the numbers may be indicated by rows rather than columns as illustrated in FIG. 9. All such modifications are intended to be within the general scope of the present invention.

I claim:

1. A business form for use in a character recognition system comprising:
   a manual marking field having a three by three matrix of nine marking spaces for each numeral in a number, said matrixes being arranged side b side in a line.

2. A business form in accordance with claim 1, wherein said manual marking field has a debit or credit marking space adjacent said line of matrixes.

3. A business form in accordance with claim 1, wherein each matrix of spaces has the numbers one through nine consecutively imprinted in the nine respective marking spaces of each matrix.

4. A business form in accordance with claim 1, wherein a simple character is placed in one space of each matrix to indicate a number in the range of one through nine and each matrix indicating a zero is unmarked.

5. A business form in accordance with claim 1, wherein said number comprises matrixes for unit dollars, decimal multiples thereof, unit cents and a decimal multiple thereof.

6. A business form in accordance with claim 1, wherein said number comprises columns for unit dollars, decimal multiples thereof, unit cents and a decimal multiple thereof.

7. A business form for use in a character recognition system comprising:
   a manual marking field having a column of three marking spaces for each numeral in a number, said columns being arranged side by side in a line.

8. A business form in accordance with claim 7, wherein said form has a marking code comprising three simple characters, the first of said characters indicating the numerals 1, 4, 7, respectively when placed in the first, second and third spaces respectively of a column, the second of said characters indicating the numerals 2, 5, and 8, respectively when placed in the first, second and third spaces respectively of a column, the third of said characters indicating the numerals 3, 6, and 9, respectively when placed in the first, second, and third spaces respectively of a column and the absence of a character in a column indicating the number zero.

9. A business form in accordance with claim 7, wherein said manual marking field has a debit or credit marking space adjacent said line of columns.

* * * * *